Jan. 26, 1937. D. E. PRIEST Re. 20,252

HACKSAW FRAME CONSTRUCTION

Original Filed Sept. 18, 1935 2 Sheets-Sheet 1

Inventor:
Dwight E. Priest
By Geo. H. Kennedy Jr.
Attorney

Jan. 26, 1937. D. E. PRIEST Re. 20,252
HACKSAW FRAME CONSTRUCTION
Original Filed Sept. 18, 1935 2 Sheets-Sheet 2
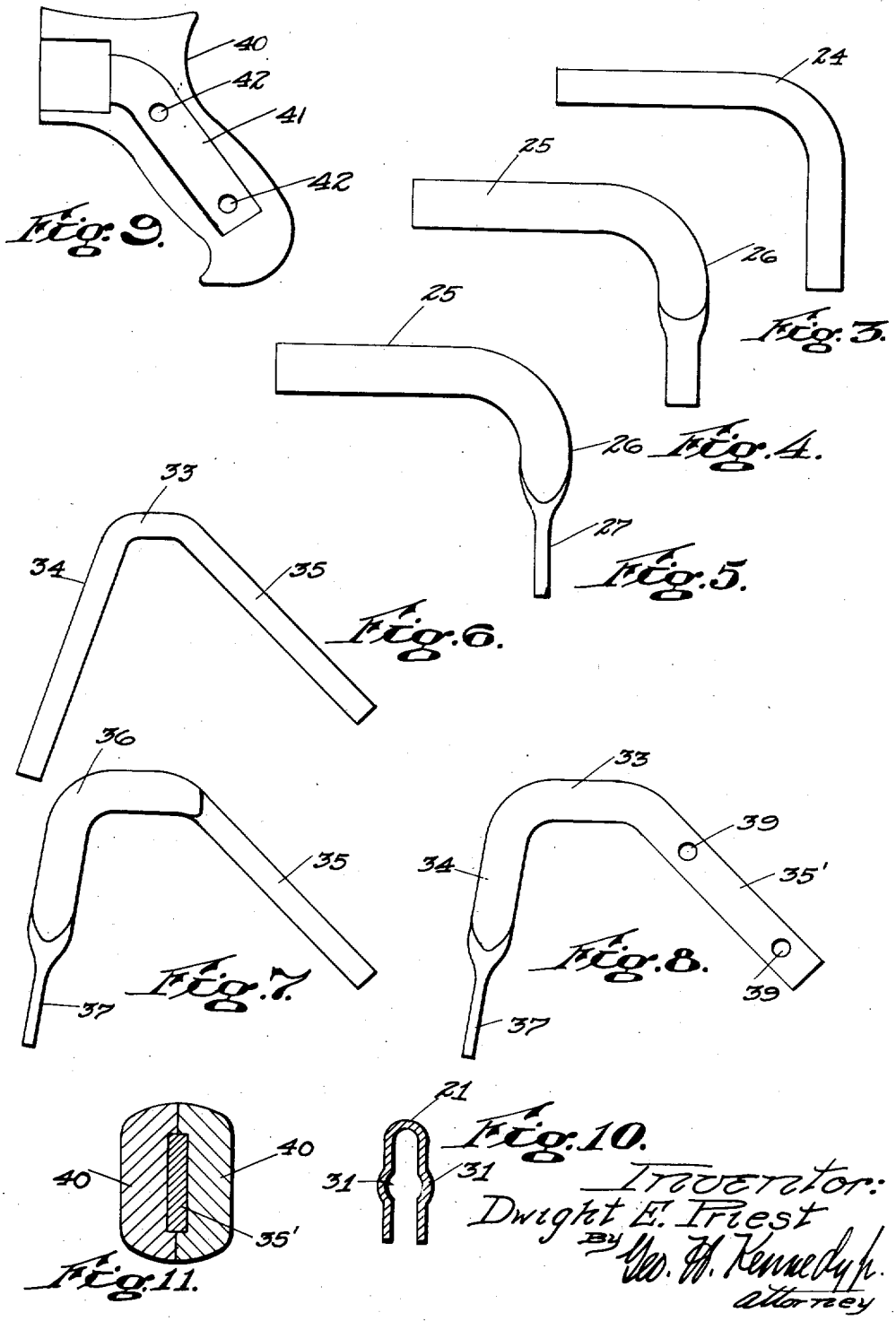
Inventor:
Dwight E. Priest
By Geo. H. Kennedy Jr.
Attorney Reissued Jan. 26, 1937

Re. 20,252

UNITED STATES PATENT OFFICE 20,252

HACKSAW FRAME CONSTRUCTION

Dwight E. Priest, Worcester, Mass., assignor to Parker Wire Goods Company, Worcester, Mass., a corporation of Massachusetts Original No. 2,058,107, dated October 20, 1936, Serial No. 41,113, September 18, 1935. Application for reissue November 30, 1936, Serial No. 113,502

2 Claims. (Cl. 145—34)

The present invention relates to hack saws and like devices, wherein the saw blade is removably mounted in an adjustable supporting and tensioning frame which is formed from wide flat metal members embraced by and united with other metal members of channel section.

The invention resides in a novel and highly useful fabrication, arrangement and assemblage of the parts constituting and associated with such a frame,—by which to simplify its manufacture and to greatly reduce the number of parts required,—at the same time providing a saw which is stronger, more durable and more satisfactory in operation than similar saws of this character now in ordinary use.

Other and further objects and advantages of the invention will be apparent from the following detailed description of the same, taken in connection with the accompanying drawings, in which—

Fig. 1 is a view in side elevation, partly in section, of a hack saw having a construction that is typical more or less of the saws of the above type now in ordinary use.

Fig. 1*a* is a fragmentary end view, partly in section, of the saw shown in Fig. 1.

Fig. 2 is a side elevation illustrating one embodiment of my improved hack saw.

Fig. 2*a* is a fragmentary end view of parts shown in Fig. 2, but on a larger scale than Fig. 2.

Figs. 3, 4, and 5 are detail views illustrating steps in the manufacture of the adjustable end member of my improved hack saw frame.

Figs. 6 and 7 are detail views illustrating steps in the manufacture of the other end member of said frame.

Fig. 8 is a view similar to Fig. 7, illustrating a modification of the invention.

Fig. 9 is a view in elevation of one of a pair of handle portions adapted to be associated with the modified construction shown by Fig. 8.

Fig. 10 is a large scale sectional view on the line 10—10 of Fig. 2.

Fig. 11 is a sectional view of the two-part handle.

Like reference characters refer to like parts in the different figures.

Figure 1:
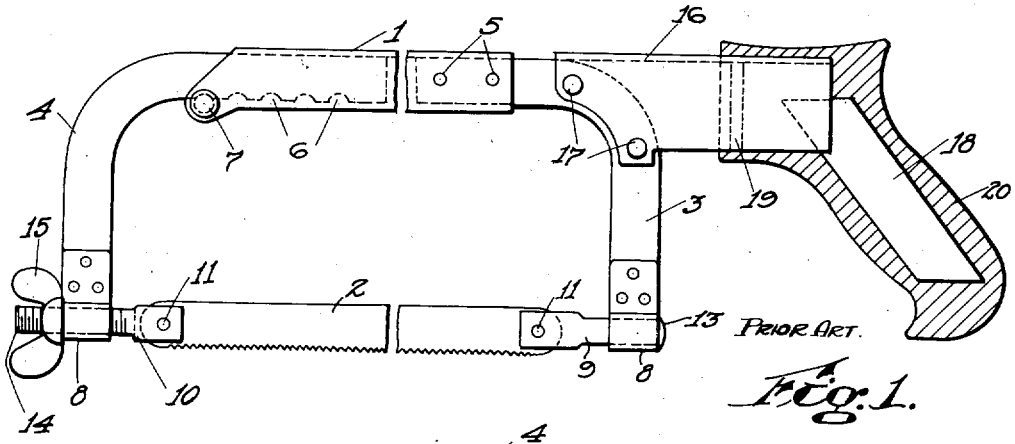

Referring first to Fig. 1, showing a typical hack saw construction of the prior art, the saw frame proper is of shallow inverted U form, being constituted by an intermediate elongated member 1, parallel to the saw blade 2 and of downwardly opening channel section, and by two end members 3 and 4 of wide relatively flat stock, the latter for each of these members being bent or curved to provide substantially horizontal portions received in the channel of member 1, and to provide substantially upright portions adapted to carry at their lower ends the devices for securing and tensioning the saw blade 2 in said frame.

In the typical prior art construction shown by Fig. 1, the end members 3 and 4, though made of relatively light stock, give the frame the necessary rigidity, because of the flatwise disposition of said stock substantially in the plane of the frame. One of said members 3 has its horizontal portion secured by rivets 5, 5, or the like, to the member 1; the other member 4 has an adjustable mounting in the member 1, to vary the length or span of the frame, and to adapt it to saw blades of different lengths; for this purpose, the horizontal portion of said member 4 is provided at its lower edge with a plurality of notches 6, 6, adapted to cooperate with a pin 7 extending across the member 1; before the saw blade is put in place, the member 4 can be moved in or out, as desired, to bring any selected notch 6 into engagement with pin 7, thereby to make the length of the frame appropriate to the length of the blade which is to be used therein.

Figure 1A:
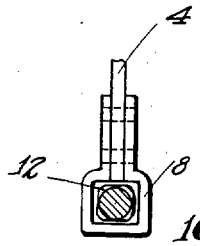
Fig. 1a. PRIOR ART

The thinness of the stock used for members 3 and 4, coupled with the fact that they must have the flatwise disposition above described, prevents the formation therein of bearing holes or sockets to receive the blade-holding and tensioning devices; this necessitates the attachment to the lower ends of members 3 and 4 by riveting, welding, or the like, of suitable socket or bearing members 8, 8, one to receive the relatively stationary blade-holding device 9, and the other to receive the tensioning blade-holding device 10. These two blade-holding or tensioning devices have pins 11, 11 for engagement with the holes at the ends of the blade 2, and provide portions 12, 12, Fig. 1*a*, of square section where they pass through the square apertures provided by the bearing members 8, 8; this construction keeps the blade 2 from tilting or turning, and provides for the holding of the same in any one of four angular positions. The device 9 has the usual head or enlargement 13, adapted to be drawn against the adjacent bearing member 8, and the device 10 is formed with a projecting threaded end 14, whereon is received a thumb nut 15 which is manipulated for the mounting or demounting of a blade and for putting the same under tension in the frame.

In a saw frame construction such as above described, it is necessary to unite to one of the members 3 or 4, by welding, riveting, or the like, a separate structure providing an operating handle or grip for the saw; as shown in Fig. 1, this structure may comprise a relatively deep channel member 16, the sides of which embrace and receive a considerable portion of the inner end member 3,—the parts being rigidly held together by a plurality of rivets 17, 17 or the like; at its other end, said channel member 16, not being of appropriate section or form to serve as a reinforcement or core for the grip or handle proper of the saw, must have welded thereto a separate member 18 for this purpose and must also, usually, be reinforced at an intermediate point of its length against collapse by an interior welded-in strut or brace 19. As shown in Fig. 1, a suitable handle or grip 20 of hard rubber, or like material, may be molded on the member 18, to embed the latter and a portion of the channel member 16,—this completing the assemblage of the very considerable number of parts above enumerated which have heretofore been considered necessary in the construction of a hack saw of this type. My invention, among other things, very materially reduces the number of such parts, without essentially altering the character of the saw; as hereinafter more fully described, my invention eliminates for all practical purposes the cost of manufacture as well as the cost of assemblage of such separate riveted-on or welded-on parts, or their equivalents, as are represented by the two socket members 8, 8, the channel member 16, the handle reinforcement member 18 and the strut or brace 19, all above referred to.

Figure 2:
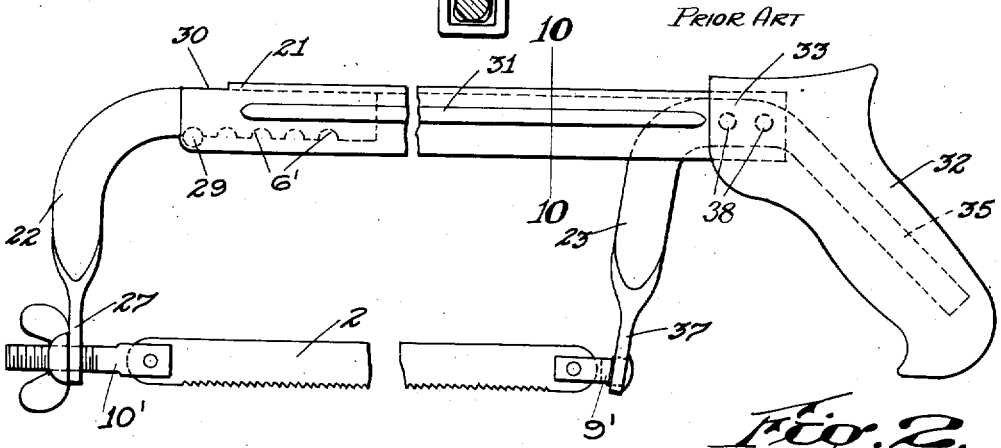
Figure 2A:
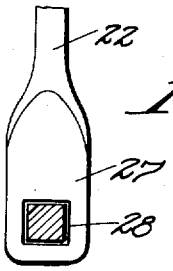

Referring now to Fig. 2, which illustrates my improved saw assembly, it will be noted that the saw blade 2 and its conventional holding and tensioning devices 9' and 10' have their mounting in a frame whose constituent parts in matters of stock dimension and section, bear a close resemblance to the constituent parts of the frame of Figure 1. That is to say, my improved frame provides in parallel relation to the saw blade 2, an elongated channel section member 21, the sides of which embrace and receive flatwise near each end the thin flat stock section of the horizontal portions of end members 22 and 23. Referring now to Figs. 3, 4, and 5, the adjustable end member 22 (corresponding functionally to the end member 4 of Fig. 1) is made, according to my invention, not from stock that is already of thin flat section, but preferably from a piece of wire rod material 24, which is initially bent or curved to appropriate form, as shown in Fig. 3, and is then subjected to a pressing, rolling or hammering operation by which to flatten out its horizontal portion 25 and also most of the length of its upright portion 26, as shown in Fig. 4. A final pressing or hammering operation is availed of to flatten out, in a plane substantially at right angles to that of portions 25 and 26, the end portion 27 of this member, as shown in Fig. 5,—this flattened portion 27 thus presenting a stock section which is ample in width, in the transverse plane, to have formed therein a square hole or socket 28 directly receiving the adjustable tensioning device 10,—thus eliminating the necessity for attaching any socket member (such as 8) to this end member 22.

Said end member 22 in its horizontal portion provides the usual notches 6', 6' for cooperation with a pin 29 of the channel member 21. It will be noted that the pin 29, unlike the pin 7 of Fig. 1, is attached to said channel member 21 within the normal area of the latter's sides,—thus allowing said channel member to be made from standard stock and eliminating the necessity for the waste of stock and/or the additional labor or machine operation involved in the offset location of the pin 7, as shown in Fig. 1. I obtain the necessary play for the adjusting movements of member 22, with respect to the pin 29 in the illustrated location, by cutting away the base or bottom of the channel member 21, as shown at 30, Fig. 2; the material thus removed is the only waste of stock that is involved in the manufacture of said channel member 21 from a strip of standard width and thickness. Preferably also, as shown in Figs. 2 and 10, this channel member 21 is given additional stiffness and rigidity by pressing or otherwise forming in its sides the longitudinal ribs 31, 31.

The channel member 21 is made much longer than the channel member 1 (Fig. 1) of the prior frame construction, and this extra length is in the direction of the handle or grip 32, in which, as hereinafter more fully described, the inner end of said channel member is embedded. The inner or stationary end member 23, like the outer end member 22, is made, as shown in Fig. 6, from wire rod stock, which is appropriately bent to provide the intermediate substantially horizontal portion 33 and the depending divergent portions 34 and 35. By suitable pressing or hammering operations, the portion 33 and most of the length of portion 34 are flattened out, as shown at 36, Fig. 7, and then the lower end of portion 34 is flattened out in a plane at right angles to provide a portion 37, Fig. 7, which matches the flattened portion 27 of the other end member 22. This flattened end 37 of end member 23 is provided with a square aperture to receive directly the conventional stationary blade-holding and tensioning device 9', and this eliminates the need for the other attaching socket or bearing member 8 (Fig. 1), as employed in prior hack saw constructions.

It is to be noted that the horizontal portion 33 of member 23 is flattened out to fit snugly in the channel of member 21, the parts being secured together by rivets 38, 38, or the like. The unflattened depending integral leg 35 of this member stands at such an angle to the horizontal portion 33 as to furnish a central core or reinforcement for the handle or grip 32, which may be molded in one piece from rubber or other appropriate material to embed said leg 35 and also the inner end of channel member 21 in the zone of the latter's reception of the flat horizontal portion 33 of member 23. Thus my invention, by providing the inner end member with an integral extension that serves for handle reinforcement, does away with all need for such separate parts as the members 16, 18 and 19 appearing in the construction shown by Fig. 1, and with the expense of the operations required to attach said parts together and to the frame.

In the modified construction of the inner end member shown by Fig. 8, the depending leg 35' that provides the handle reinforcement is flattened out by the same operation that flattens the portions 33 and 34,—and suitable screw or rivet holes 39 are provided in said flattened handle reinforcement. This adapts the handle reinforcement to the attachment of a two-part handle, one of the halves of which is shown at 40 in Fig. 9. Each such handle half has a suitable interior recess 41, the two recesses cooperating to provide a space that snugly receives the flattened leg 35', Fig. 8, and the adjacent inner end portion of the channel member 21 where it receives and is attached to the rearward or inward bend of end member 23. These handle halves provide screw or rivet holes 42 registering with the holes 39 for the reception of suitable rivets or screws, not shown, which firmly unite the handle sections together and to the saw frame.

In my improved construction, whether it have the one-piece handle 32 of Fig. 2, or the two-piece handle whose construction is shown by Fig. 9, the handle is provided on an integral part of the frame itself, and thus is much more intimately and rigidly associated with the frame structure than is the handle 20 of Fig. 1, which is obliged to support the saw frame through the medium of a plurality of intermediate connected parts which are wholly eliminated in my improved construction. The latter thus materially simplifies and reduces the cost of manufacture and assemblage of a hack saw of the type described.

Further, it is to be noted that my improved construction presents no exposed rivets or welds. The only welds or rivets required are those at 38, 38 which secure the end member 23 to the channel member 21, and by my improved construction and arrangement of parts, these points are so disposed as to be entirely covered by the handle 32 or by the handle 40, 40, as the case may be. In the usual frame construction as typified by Fig. 1, the fact that there are exposed points of welding or riveting necessitates the subjection of the assembled frame to a pickling operation before it can be plated with nickel or the like, since otherwise the discoloration from the heat applied in welding or riveting would result in non-uniformity of finish in the completed structure. The expense of this pickling operation is wholly dispensed with, in the manufacture of my improved frame.

I am aware that it is not new in a saw frame construction, made of stock of wide flat section in the plane of said frame, to twist such stock at the extremities of said frame into planes transverse to that of the saw frame in order to provide requisite bearing area for saw-blade attachment. Such twisting of the flat stock as disclosed for example in Ladd Patent No. 595,315, December 14, 1897, greatly impairs the strength and stiffness of the frame, and I make no claim to any such construction or mode of manufacture for saw frame members.

What I do claim and desire to secure by Letters Patent is:—

1. In a frame construction for hack saws and the like, the combination with a channel-section member substantially paralleling the saw blade, of a second member bent to provide two depending legs, one for the attachment of a saw blade retaining device and the other for the attachment of a handle, said first-mentioned leg, except at its extremity, being of relatively wide flat section in the plane of the saw frame and having a portion thereof received within and rigidly attached to said channel-section member, the extremity of said leg being of relatively wide flat section in a plane transverse to the saw frame plane, thereby to give sufficient width of stock for an aperture in said leg extremity to receive the saw blade retaining device, the stock of said first-mentioned leg in the zone of transition between the respective wide flat sections in said planes at right angles to each other being substantially without twist, whereby to maintain unimpaired the strength and stiffness of said leg, and a handle embedding the other leg of said second frame member.

2. In a frame construction for hack saws and the like, the combination with a channel-section member substantially paralleling the saw blade, of a pair of end members, each with a portion received within said channel-section member and each with a depending leg portion adapted to carry a saw blade retaining device, each of said end members, except at the extremity of its depending leg, being of relatively wide flat section in the plane of the saw frame, thereby to stiffen said frame in said plane, the leg extremity of each end member being of a relatively wide flat section substantially uniform with that of the remainder of said leg, but in a plane transverse to the saw frame plane, thereby to give sufficient width of stock for an aperture in said leg extremity to receive a saw blade retaining device, the stock of each end member in the zone of transition between the respective wide flat sections in said planes at right angles to each other being substantially without twist, whereby to maintain unimpaired the strength and stiffnesss of said end member, at least one of said end members being adjustable longitudinally, relative to said channel-section member.

DWIGHT E. PRIEST.